United States Patent
Loose

(10) Patent No.: US 7,525,586 B2
(45) Date of Patent: Apr. 28, 2009

(54) IMAGE SENSOR AND METHOD WITH MULTIPLE SCANNING MODES

(75) Inventor: Markus Loose, Thousand Oaks, CA (US)

(73) Assignee: Altasens, Inc., Westlake Village, CA (US)

( * ) Notice: Subject to any disclaimer, the term of this patent is extended or adjusted under 35 U.S.C. 154(b) by 1024 days.

(21) Appl. No.: 10/436,947

(22) Filed: May 12, 2003

(65) Prior Publication Data

US 2004/0227828 A1 Nov. 18, 2004

(51) Int. Cl.
*H04N 3/14* (2006.01)
*H04N 5/335* (2006.01)

(52) U.S. Cl. ....................... 348/308; 348/302

(58) Field of Classification Search ................. 348/308, 348/302, 303, 294, 311; 250/208.1; 257/291, 257/292
See application file for complete search history.

(56) References Cited

U.S. PATENT DOCUMENTS

| | | | |
|---|---|---|---|
| 5,949,483 A * | 9/1999 | Fossum et al. | 348/303 |
| 6,839,452 B1 * | 1/2005 | Yang et al. | 382/103 |
| 7,030,920 B1 * | 4/2006 | Hayashi et al. | 348/302 |
| 7,106,374 B1 * | 9/2006 | Bandera et al. | 348/308 |
| 7,158,183 B1 * | 1/2007 | Ohta | 348/364 |

OTHER PUBLICATIONS

R. H. Nixon et al., "256×256 CMOS Active Pixel Sensor Camera-On-A-Chip", *IEEE Journal of Solid State Circuits*, vol. 31, No. 12, (Dec. 1996) pp. 2046-2050.

Danny Scheffer et al., "Random Addressable 2048×2048 Active Pixel Image Sensor", *IEEE Transactions on Electron Devices*, vol. 44, No. 10, (Oct. 1997) pp. 1716-1720.

S. P. Monacos et al., "A High Frame Rate CCD Camera With Region-Of-Interest Capability", *IEEE*, Jet Propulsion Laboratory, California Institute of Technology, (2001) pp. 1513-1522.

* cited by examiner

*Primary Examiner*—Lin Ye
*Assistant Examiner*—Gevell Selby
(74) *Attorney, Agent, or Firm*—Venable LLP; Stefan J. Kirchanski; Matthew J. Spark

(57) ABSTRACT

Multiple scanning modes are provided for an array of electromagnetic radiation sensors. In the preferred implementation both selectable subarrays and the overall array can be read out and reset in any desired order, including interrupting a full array scan for a subarray scan and then resuming the full array scan.

15 Claims, 2 Drawing Sheets

IMAGE SENSOR AND METHOD WITH MULTIPLE SCANNING MODES

BACKGROUND OF THE INVENTION

1. Field of the Invention

This invention relates to digital imaging devices and methods, and more particularly to multimode scanning of an image sensor.

2. Description of the Related Art

Imaging sensors are used in digital cameras and camcorders, high definition televisions (HDTV), telescopes and other equipment. Two types of image sensors commonly used for these applications are charge coupled device (CCD) and complementary metal oxide semiconductor (CMOS). Each includes a detector portion, typically a two-dimensional array of pixel circuits. Each pixel circuit contains both a detector that converts photons (electromagnetic radiation) into a charge (electron-hole pairs), that accumulates at the detector, and an output circuit. Each detector has a maximum charge that it is capable of holding. When this maximum charge has accumulated, the detector saturates and cannot hold any more.

Each pixel senses one small area within the larger image, with its circuit outputting a signal representing that portion of the image. The pixel circuits may require resetting to obtain a new image or to accommodate a bright star that has saturated the circuit.

Image sensing for astronomy applications currently requires two image sensors to record an image of the sky. One sensor is used to fix the telescope orientation with respect to a "guide star" as the earth rotates, and another to sense the image. The guide star is typically a bright star that can be easily tracked. Because a bright star is used, the guide star sensor quickly saturates and must be reset more frequently than the image sensor. Also, for accurate tracking, a high frame rate is required for the guide star sensor.

Most imaging sensors read out and reset rows or columns of pixels at a time. This makes it difficult to concentrate on only one portion of the overall image.

SUMMARY OF THE INVENTION

The present invention is a method and system which overcomes the problems noted above. It provides for multiple scanning modes in an image sensor. Selected subarrays of an image sensor can be read and reset independently of the rest of the sensor. This is useful for the astronomy application mentioned above, as well as in other applications for which only a portion of an image sensor needs to be read and/or reset.

One embodiment of the invention includes a controller configured to produce a control signal that indicates a subarray to be scanned, selection circuits connected to select the subarray, and scanning circuits connected to scan the selected subarray.

Further features and advantages of the invention will be apparent to those skilled in the art from the following detailed description, taken together with the accompanying drawings.

DETAILED DESCRIPTION OF THE INVENTION

Figure 1:
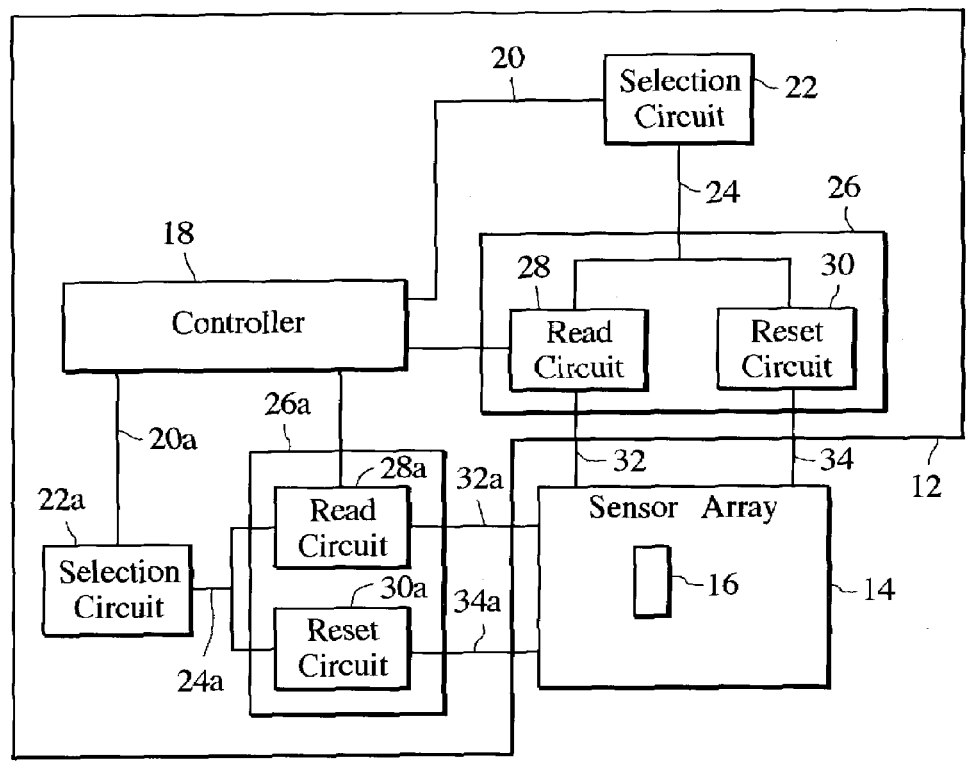
FIG. 1 is a block diagram of a digital imaging system utilizing multiple mode control according to one embodiment of the invention.

An imaging system according to one embodiment of the invention is shown in FIG. 1. It includes a multiple mode control circuit 12 that is configured to scan an array of electromagnetic radiation sensors 14 and selectable subarrays 16. The invention is most commonly applicable to photosensitive detectors which are sensitive to visible light, infrared and/or ultraviolet, but it is also applicable to other regions of the electromagnetic spectrum.

Control circuit 12 includes a controller 18 that controls the operation of the imaging system. Controller 18 sends control signals on control lines 20 and 20a to selection circuits 22 and 22a, respectively. The control signals include the coordinates of a subarray to be scanned. Selection circuits 22 and 22a generate selection signals on selection lines 24 and 24a that determine the subarray to be scanned, and whether to read or reset the subarray.

Scanning circuits 26 and 26a include read circuits 28 and 28a and reset circuits 30 and 30a, respectively. Scanning circuits 26 and 26a activate the read or reset circuits to either read or reset a desired sensor in array 14. When activated, read circuits 28 and 28a generate read signals on lines 32 and 32a that cause a selected sensor in the array or subarray to be read out. Reset circuits 30 and 30a, when activated, generate reset signals on lines 34 and 34a that cause a reset of a selected sensor in the array or subarray.

Scanning is typically accomplished by reading out the voltage on an individual sensor, then resetting it. However, a scan could be a read without a reset, or a reset without a read. With the present configuration, entire rows or columns can be read or reset at one time, or selected sensors in the row or column can be read or reset.

The sensors in array 14 are defined and accessed by a set of coordinates. While the description above is for rows and columns, these could be interchanged, or other array geometries such as concentric circular, staggered pixels, or three-dimensional could be used.

Controller 18 controls whether the entire array 14 or a subarray 16 is scanned. Subarrays can be read and reset independent of the entire array. The controller can pause the scanning of the full array at any time to scan a subarray. This is particularly useful when a portion of the full array becomes saturated. More than one subarray may be scanned if desired.

Figure 2:
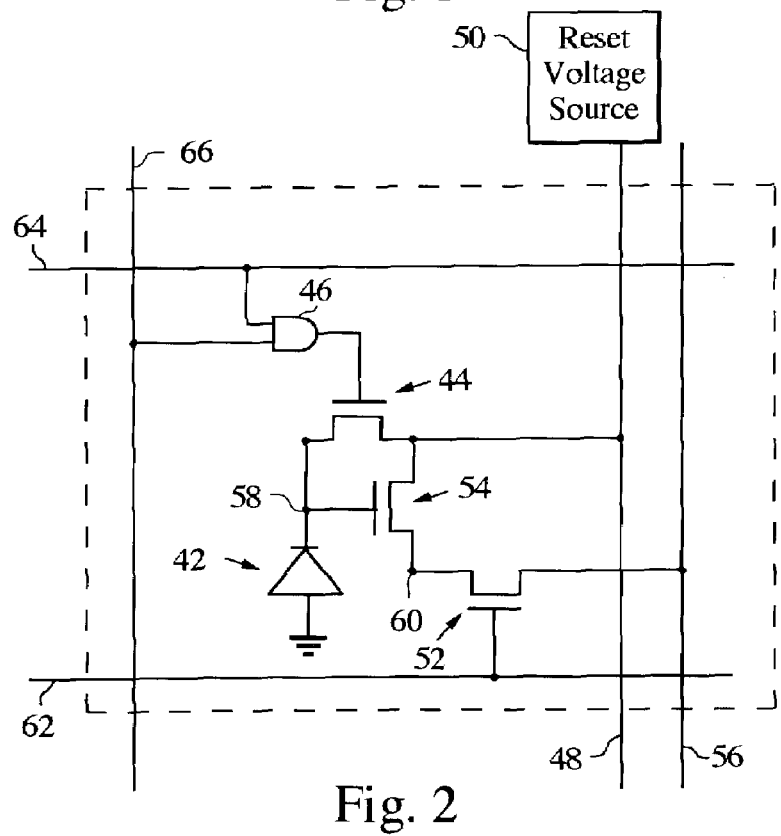
FIG. 2 is a schematic diagram of an individual pixel reset circuit used in one embodiment of the invention.

One possible pixel with an individual reset circuit is shown in FIG. 2. The pixel includes an electromagnetic radiation sensor 42 that accumulates charge in response to received radiation, and a reset transistor 44 that, when activated by a logic gate 46, connects a reset voltage on reset voltage line 48 to sensor 42 to reset its voltage level. A voltage source 50 supplies reset voltage line 48, and can provide enough current to reduce the voltage on the sensor to the level on reset voltage line 48. The reset voltage is typically a low voltage such as 0-500 millivolts for a p-n type sensor. Sensor 42 is typically a photodiode, but may be a phototransistor or other type of electromagnetic sensing device.

A read transistor 52 and a source follower transistor 54 have their source-drain circuits connected in series from a read bus 56 to the source-drain circuit of reset transistor 44. Source follower transistor 54 has its gate connected to the detector's output node 58. The voltage at node 60, between transistors 52 and 54, tracks the voltage at detector node 58 through the normal source follower action of transistor 54. To read out a signal from the pixel, a voltage is applied to a read enable line 62, which is connected to the gate of read transistor 52, sufficient to turn on the read transistor, which then applies the voltage at node 60 to the read bus 56 through its activated source-drain circuit.

Logic gate 46 receives logic inputs from row and column reset lines 64 and 66. When both row reset line 64 and column reset line 66 are activated, gate 46 activates reset transistor 44.

This causes the voltage on detector node 58 to be set to the voltage on reset voltage line 48, as described above.

Logic gate 46 is typically an AND gate, but other types of logic gates that turn on reset transistor 44 when row reset line 64 and column reset line 66 are activated could be used. The reset lines can be activated by positive, zero or negative voltages, depending upon the nature of the logic gate 46. For example, if an exclusive NOR gate is employed, reset transistor 44 would be turned on in response to an absence of voltage on both reset lines. The type of logic gate used and the nature of the signals applied to the reset lines also depend on the nature of reset transistor 44. For example, if transistor 44 were an nFET device rather than a pFET, gate 46 would need to provide an opposite signal in response to the same inputs from the reset lines. As an alternative to logic gate 46, a second reset transistor could be connected in series with transistor 44, with one transistor controlled by the row reset line 64 and the other by column reset line 66, so that reset occurs only when both transistors are activated.

Figure 3:
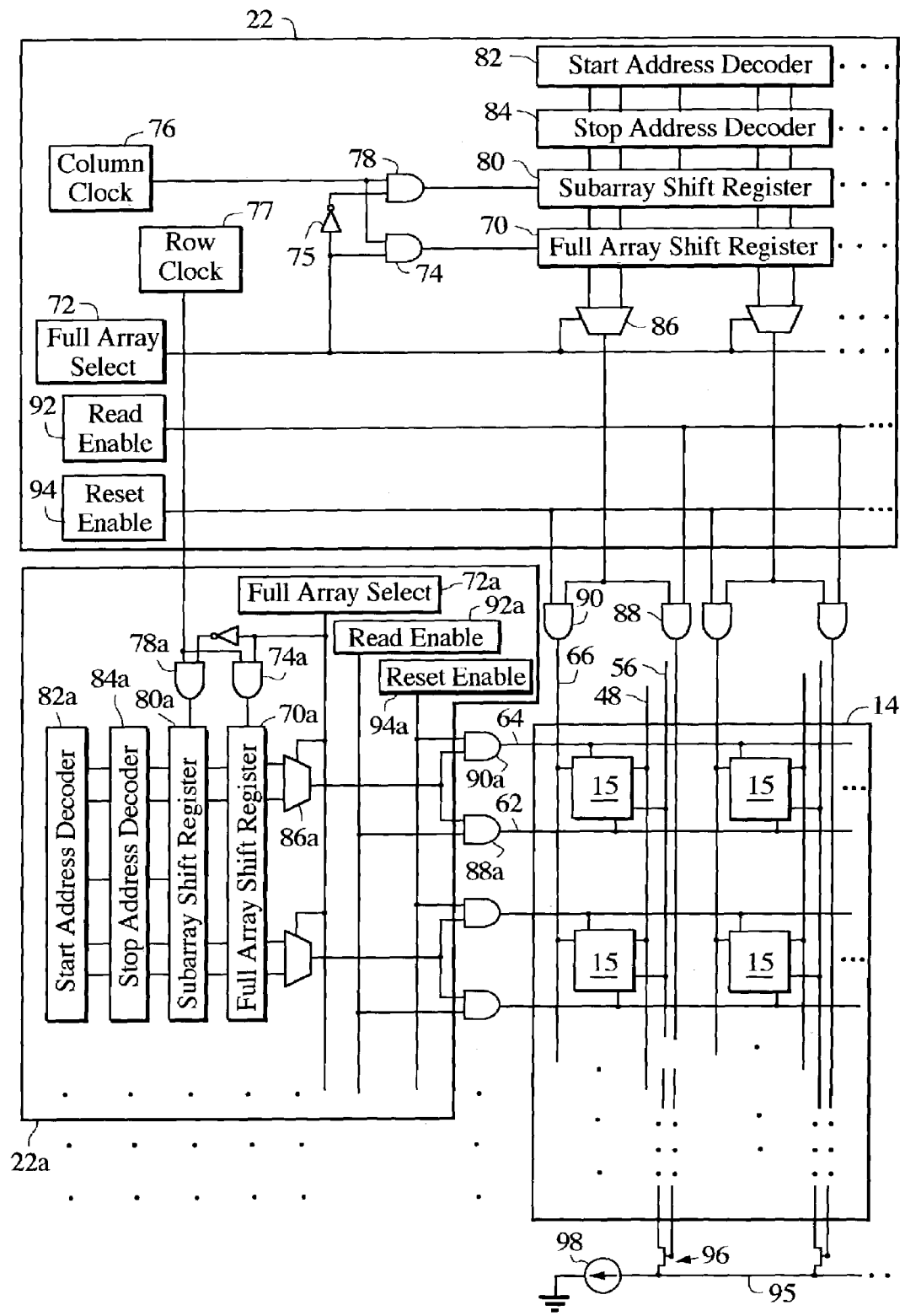
FIG. 3 is a schematic diagram of one implementation for the digital imaging system of FIG. 1.

A simplified digital imaging system with an array of pixels 14 employing multiple mode control according to one embodiment of the invention is shown in FIG. 3. Individual pixels 15 are shown spaced widely apart for ease of illustrating the various signal lines, but in practice they would be much closer together.

Selection circuit 22 includes a full-array shift register 70 that is controlled by the controller 18 (not shown). When full array select circuit 72 is activated, it sends a signal to AND gate 74, which advances the full-array shift register 70 each time a pulse is received from a column clock 76. This shifts all values in the shift register to the right by one place. Controller 18 applies a logic "1" to first register from the left within full array shift register 70. With successive clock pulses, the 1 is shifted through the register to enable a desired operation upon each column in the array in succession. The corresponding row circuitry operates in a similar fashion, except its timing is controlled by a row clock 77 that operates at a frequency that is less than that of the column clock by a factor equal to the number of columns. This allows the pixels in the first row to be operated upon in sequence at each column clock pulse. A row clock pulse is generated when the last pixel in the first row has been operated upon. Each pixel in the second row is then operated upon in sequence at each successive column clock pulse, and so on until the entire array has been scanned.

When full-array select circuit 72 is deactivated by the controller, its logic 0 output is inverted to a logic 1 by an inverter 75 and applied as one input to another AND gate 78. The other input to AND gate 78 is supplied by the column clock 76. AND gate 78 controls a subarray shift register 80 that operates in a manner similar to full-array shift register 70. The full-array select circuit 72 thus controls whether scanning is performed by the full-array shift register 70 or the subarray shift register 80.

Subarray shift register 80 receives location information, including a start and stop column for the subarray to be scanned, from a subarray start address decoder 82 and a subarray stop address decoder 84, respectively. The decoder 82 and 84 are programmed with this information by controller 18. Output lines are provided from the decoders to each individual register within subarray shift register 80. Start address decoder 82 activates one output line at a time, corresponding to the column number received from the controller. For example, if the controller provided the digital number 8, the decoder would place a "1" into the eighth bit from the left in the shift register 80, causing subarray scanning to start at the eighth column from the left. The first decoder output line is activated in response to a digital zero input from the controller. A decoder with an n bit input can control $2^n$ outputs, allowing 2048 lines of rows and/or columns can be controlled with an 11-bit word from the controller. Other decoder configurations can be used for different size arrays.

In this manner, a "1" is placed into the shift register 80 at the column where the subarray is to start. The "1" is shifted through the shift register to sequentially scan the pixels of a given row within the subarray.

When the stop column for the subarray is reached, a 0 is forced into the register following the stop column location by the stop address decoder 84 to discontinue scanning. Alternatively, another logic gate (not shown) may be used between the decoders and the shift registers. When activated, the logic gate would place a "0" into the register following the last row or column of the subarray to be scanned. With this configuration, the start and stop columns may be placed into the subarray shift register and the subarray scanned. Corresponding row circuitry similarly controls the start and stop rows of the subarray to be scanned.

The array 14 is typically read from the upper left corner to the lower right corner, row by row. There is one register in full-array shift register 70 per column. When a register has a "1" in it, a signal is sent to a multiplexer 86 for that column. An activated full-array select circuit 72 activates full-array shift register 70 at each clock pulse, and multiplexer 86 passes the signal from full-array shift register 70. A deactivated full-array select circuit 72 activates subarray shift register 80 at each clock pulse, and multiplexer 86 passes the signal from subarray shift register 80.

Multiplexers 86 provide one of two signals needed to activate either a read logic gate 88 or a reset logic gate 90 for a particular column. The other input to activate read logic gate 88 comes from a read enable circuit 92, which is controlled by the controller. The other input to activate reset logic gate 90 comes from a reset enable circuit 94, which is also controlled by the controller.

The reset of an individual pixel 15 occurs in response to activation of reset logic gate 90, which activates column reset line 66 and provides one input to logic gate 46, as described in connection with FIG. 2. The other input needed to reset a pixel is provided from row reset line 64, which is activated in a manner similar to column reset line 66, by corresponding circuitry for each row of array 14.

The reading of pixels occurs when the read enable line 62 is activated by corresponding row circuitry, which matches and sends the voltage from every sensor in a selected row to the read bus for that row, as described above. Read logic gate 88 is then enabled, sending a signal that activates a vertical read enable transistor 96 that allows the voltage on read bus 56 for a selected column to be read out by the controller. When read enable line 62 is activated, the voltage from every sensor in the row is applied to its respective read bus 56. However, the only voltages read out from the read buses are from the column(s) that have their vertical read enable transistor 96 activated. In this manner, an entire row or individual sensors can be read out.

The row selection circuit 22a is similar to the column selection circuit 22. Row selection circuit 22a includes subarray start and stop decoders 82a and 84a, a subarray shift register 80a, a full-array shift register 70a, a multiplexer 86a, full-array select circuit 72a, read enable circuit 92a, reset enable circuit 94a, and logic gates 74a and 78a, all of which are connected and operate in a manner similar to the corresponding column elements.

The row selection circuit 22a controls logic gates 90a and 88a, which in turn control row enable and reset lines 62 and 64 each row. Activated row and column reset lines 64 and 66 reset the pixel at their intersection, as described above. An activated read enable line 62 allows the voltage from each sensor in that row to be read by read bus 56 and applied to a common read bus 95 when a corresponding vertical read enable transistor 96 is activated. Row selection circuit 22a also includes horizontal clock 77 that is controlled as described above. A keep-alive current source 98 can be connected to the common read bus to maintain the source follower transistors in the read out pixels in an active state, or less desirably an individual keep-alive transistor could be provided within each pixel.

With this configuration, the full array and a subarray (or more than one subarray) can be scanned in any desired order. For example, the scanning of the full array can be interrupted to scan a subarray, or the subarray can be scanned before or after the full array is scanned. When reactivated, the full-array scanning continues at the point of interruption, because full-array shift registers 70 and 70a retain the values of the row and column at which scanning was interrupted.

While particular embodiments of the invention have been shown and described, numerous variations and alternate embodiments will occur to those skilled in the art. For example, while FETs have been shown, other transistor types such as bipolar could be used. Accordingly, it is intended that the invention be limited only in terms of the appended claims.

I claim:

1. An imaging system, comprising:
a pixel array for sensing an image;
a read out circuit connected to read out pixels of said array;
a control circuit connected to said read out circuit to enable a read out of the pixels in selectable subarrays of said array;
a reset circuit connected to reset the pixels of said array, said control circuit connected to said reset circuit to enable a reset of the pixels in said selectable subarrays; wherein the read out and reset circuits are directly managed by the control circuit during a scan of the pixel array to read and reset selected pixels, to read but not reset selected pixels or to reset but not read selected pixels;
a shift register; and
a decoder connected to provide location signals to indicate a subarray to be scanned; wherein the shift register is responsive to the decoder to enable either the read out circuit or the reset circuit for the pixels of a selected subarray.

2. The system of claim 1, wherein said control circuit is also connected to selectably enable a read out of the full array.

3. The system of claim 2, wherein said control circuit is programmable to initiate a read out of the full array, to interrupt said full array read out and enable the read out of a selected subarray, and to thereafter complete said full array read out.

4. The system of claim 1, wherein said pixel array is arranged in rows and columns, and said control circuit enables a read out of a selected subarray by designating start and stop columns and start and stop rows for said readout.

5. An imaging system, comprising:
an array of pixels, wherein each pixel includes an electromagnetic radiation sensor;
a shift register; and
a multiple mode control circuit controllable to scan selectable subarrays within said array, wherein said control circuit comprises a controller configured to produce a control signal that designates a subarray to be scanned; a selection circuit responsive to said control signal to select a subarray to be scanned, and a scanning circuit connected to scan the pixels in a selected subarray; wherein the selection and scanning circuits are directly managed by the controller during a scan of the array to read and reset selected pixels, to read but not reset selected pixels or to reset but not read selected pixels; wherein the scanning circuit comprises a read circuit configured to read out pixels of the array, and a reset circuit configured to reset pixels of the array; the selection circuit comprises a decoder connected to provide location signals to indicate a subarray to be scanned;
wherein the shift register is responsive to the decoder to enable either the read circuit or the reset circuit for the pixels of a selected subarray.

6. The system of claim 5, wherein said control circuit is also controllable to scan said array as a whole.

7. The system of claim 5, wherein each pixel further comprises:
a respective reset transistor connected to enable, when activated, a reset of the pixel's sensor; and
a respective logic gate connected to activate said reset transistor in response to a plurality of reset signals.

8. The imaging system of claim 5, wherein said selection circuit further comprises:
a multiplexer circuit configured to enable either said read circuit or said reset circuit for each pixel in a selected subarray.

9. The imaging system of claim 5, wherein said read circuit comprises:
a logic gate connected to transmit a sensor signal to a read bus; and
a transistor connected to said read bus to enable said sensor signal to be read out from said read bus.

10. The imaging system of claim 5, wherein said reset circuit comprises:
an individual pixel reset circuit connected to reset a selectable pixel in response to a plurality of reset signals.

11. The imaging system of claim 10, wherein said individual pixel reset circuit comprises:
a respective reset transistor associated with each pixel and connected to enable a reset of said pixel; and
a respective logic gate associated with each pixel and connected to activate the pixel's reset transistor in response to a plurality of reset signals.

12. A method of reading out an array of electromagnetic radiation sensors, comprising:
reading out the full array of sensors;
selecting a subarray of said sensors;
reading out said selected subarray separate from reading out the full array;
resetting the selected subarray after the selected subarray has been read out; and
controlling the reading, the selecting and the resetting in order to read and reset an individual sensor, read but not reset the individual sensor or reset but not read the individual sensor; connecting a decoder to provide location signals to indicate a subarray to be scanned; and
using a shift register responsive to the decoder to enable either the reading out or the resetting of the selected subarray.

13. The method of claim 12, further comprising selecting a plurality of different subarrays of said sensors and reading out each of said selected subarrays separate from reading out the full array.

14. The method of claim 12, wherein the reading out of said full array is interrupted, said selected subarray is read out during said interruption, and said full array read out is thereafter completed.

15. The method of claim 12, wherein said sensors are arranged in rows and columns, and the read out of a selected subarray is controlled by designating start and stop columns and start and start rows for read out.

* * * * *